(12) United States Patent
Rodriguez

(10) Patent No.: US 12,309,190 B2
(45) Date of Patent: May 20, 2025

(54) AUTOMATED EFFECTIVE TEMPLATE GENERATION

(71) Applicant: KnowBe4, Inc., Clearwater, FL (US)

(72) Inventor: Jasmine Rodriguez, Clearwater, FL (US)

(73) Assignee: KnowBe4, Inc.

(*) Notice: Subject to any disclaimer, the term of this patent is extended or adjusted under 35 U.S.C. 154(b) by 312 days.

(21) Appl. No.: 18/100,084

(22) Filed: Jan. 23, 2023

(65) Prior Publication Data

US 2023/0171283 A1   Jun. 1, 2023

Related U.S. Application Data

(63) Continuation of application No. 17/899,316, filed on Aug. 30, 2022, now Pat. No. 11,563,767.

(60) Provisional application No. 63/240,147, filed on Sep. 2, 2021.

(51) Int. Cl.
*H04L 9/40* (2022.01)

(52) U.S. Cl.
CPC ...... *H04L 63/1433* (2013.01); *H04L 63/1483* (2013.01)

(58) Field of Classification Search
None
See application file for complete search history.

(56) References Cited

U.S. PATENT DOCUMENTS

| | | |
|---|---|---|
| 8,615,807 B1 | 12/2013 | Higbee et al. |
| 8,635,703 B1 | 1/2014 | Belani et al. |
| 8,719,940 B1 | 5/2014 | Higbee et al. |
| 8,910,287 B1 | 12/2014 | Belani et al. |
| 8,966,637 B2 | 2/2015 | Belani et al. |
| 9,053,326 B2 | 6/2015 | Higbee et al. |
| 9,246,936 B1 | 1/2016 | Belani et al. |
| 9,253,207 B2 | 2/2016 | Higbee et al. |

(Continued)

FOREIGN PATENT DOCUMENTS

| | | |
|---|---|---|
| EP | 3 582 468 A1 | 12/2019 |
| WO | WO-2016/164844 A1 | 10/2016 |

OTHER PUBLICATIONS

Notice of Allowance on U.S. Appl. No. 17/899,316 dated Dec. 14, 2022 (15 Pages).

*Primary Examiner* — Khang Do
(74) *Attorney, Agent, or Firm* — Foley & Lardner LLP

(57) ABSTRACT

The systems and methods disclose an automated effective template generation and recommendation for selection. A semantic similarity of a plurality of messages may be identified that at least meets a similarity threshold, each of the plurality of messages reported by a plurality of users as a potentially malicious message. The plurality of messages may be indexed under a common template identifier. One or more messages of the plurality of messages indexed under the common template identifier may be determined to have a report-to-reach ratio less than a report-to-reach threshold. Responsive to the determination, the one or more messages may be identified to be used for generating one or more simulated phishing templates. A recommendation of the one or more templates may be provided to a system administrator and/or a security awareness and simulation training platform to create and deliver simulated phishing messages using the templates.

20 Claims, 8 Drawing Sheets

(56) References Cited

U.S. PATENT DOCUMENTS

| | | |
|---|---|---|
| 9,262,629 B2 | 2/2016 | Belani et al. |
| 9,325,730 B2 | 4/2016 | Higbee et al. |
| 9,356,948 B2 | 5/2016 | Higbee et al. |
| 9,398,038 B2 | 7/2016 | Higbee et al. |
| 9,591,017 B1 | 3/2017 | Higbee et al. |
| 9,667,645 B1 | 5/2017 | Belani et al. |
| 9,912,687 B1 | 3/2018 | Wescoe et al. |
| 10,313,387 B1 | 6/2019 | Kras |
| 10,904,186 B1 | 1/2021 | Everton et al. |
| 10,986,122 B2 | 4/2021 | Bloxham et al. |
| 11,044,267 B2 | 6/2021 | Jakobsson et al. |
| 11,184,393 B1 | 11/2021 | Gendre et al. |
| 11,297,094 B2 | 4/2022 | Huda |
| 2012/0215853 A1 | 8/2012 | Sundaram et al. |
| 2016/0164898 A1 | 6/2016 | Belani et al. |
| 2016/0301705 A1 | 10/2016 | Higbee et al. |
| 2016/0308897 A1* | 10/2016 | Chapman ............... G06F 40/186 |
| 2016/0337401 A1 | 11/2016 | Bendersky et al. |
| 2017/0126730 A1* | 5/2017 | Oberheide .......... H04L 63/1483 |
| 2018/0191754 A1 | 7/2018 | Higbee et al. |
| 2019/0171822 A1* | 6/2019 | Sjouwerman ....... H04L 63/1483 |
| 2019/0171934 A1 | 6/2019 | Sites |
| 2019/0171984 A1* | 6/2019 | Irimie ................ G06Q 10/0635 |
| 2019/0173819 A1 | 6/2019 | Wescoe et al. |
| 2019/0173913 A1* | 6/2019 | Kras .................... H04L 63/1483 |
| 2019/0173916 A1 | 6/2019 | Irimie et al. |
| 2019/0173918 A1* | 6/2019 | Sites ...................... G06N 3/044 |
| 2019/0173919 A1 | 6/2019 | Irimie et al. |
| 2019/0245885 A1 | 8/2019 | Starink et al. |
| 2019/0289030 A1 | 9/2019 | Kras |
| 2020/0250303 A1* | 8/2020 | Lowry ................ G06F 11/3409 |
| 2020/0311260 A1 | 10/2020 | Klonowski et al. |
| 2020/0366713 A1 | 11/2020 | Rodriguez et al. |
| 2021/0021612 A1 | 1/2021 | Higbee |
| 2021/0075827 A1* | 3/2021 | Grealish ............. H04L 63/1483 |
| 2021/0153596 A1 | 5/2021 | Voggenauer |
| 2021/0185075 A1 | 6/2021 | Adams |
| 2021/0194924 A1 | 6/2021 | Heinemeyer et al. |
| 2021/0390181 A1 | 12/2021 | McClay |
| 2021/0407308 A1 | 12/2021 | Brubaker et al. |
| 2022/0005373 A1* | 1/2022 | Nelson ................... G06N 20/00 |
| 2022/0006830 A1 | 1/2022 | Wescoe |
| 2022/0060499 A1 | 2/2022 | Huda |
| 2022/0078207 A1 | 3/2022 | Chang et al. |
| 2022/0094702 A1 | 3/2022 | Saad Ahmed et al. |
| 2022/0100332 A1 | 3/2022 | Haworth et al. |
| 2022/0116419 A1 | 4/2022 | Kelm et al. |
| 2022/0130274 A1 | 4/2022 | Krishna Raju et al. |
| 2022/0286419 A1 | 9/2022 | Stetzer et al. |

* cited by examiner

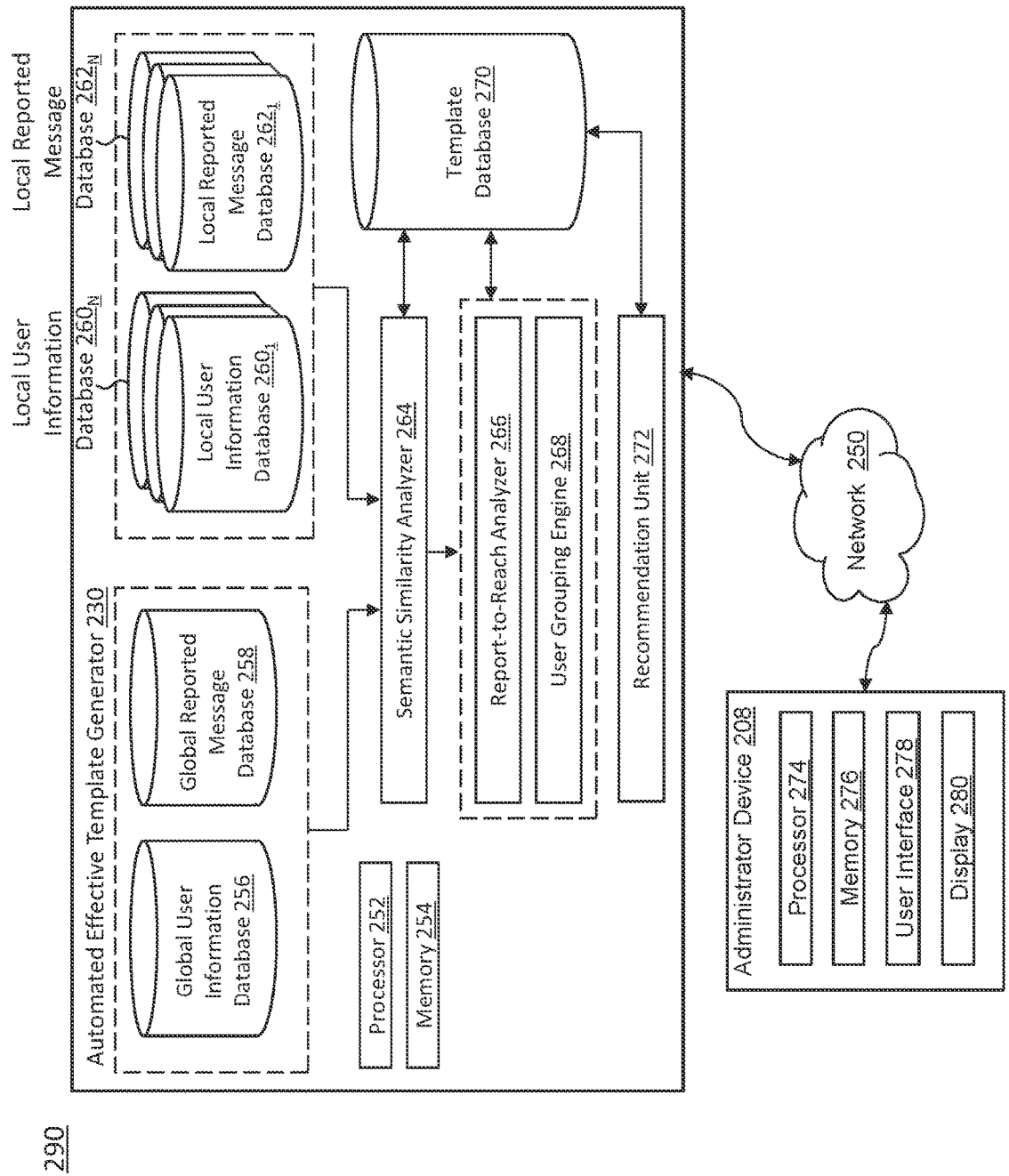
Fig. 2B (Block Diagram)

AUTOMATED EFFECTIVE TEMPLATE GENERATION

RELATED APPLICATIONS

This patent application is a Continuation of and claims the benefit of and priority to U.S. patent application Ser. No. 17/899,316 titled "AUTOMATED EFFECTIVE TEMPLATE GENERATION," and filed Aug. 30, 2022, which claims the benefit of and priority to U.S. Provisional Patent Application No. 63/240,147 titled "AUTOMATED EFFECTIVE TEMPLATE GENERATION," and filed Sep. 2, 2021, the contents of all of which are hereby incorporated herein by reference in its entirety for all purposes This disclosure generally relates to security awareness management. In particular, the present disclosure relates to systems and methods for automated effective template generation and recommendation for selection.

BACKGROUND OF THE DISCLOSURE

Cybersecurity incidents cost companies millions of dollars each year in actual costs and can cause customers to lose trust in an organization. The incidents of cybersecurity attacks and the costs of mitigating the damage are increasing every year. Many organizations invest in cybersecurity tools such as antivirus, anti-ransomware, anti-phishing, and other quarantine platforms. Such cybersecurity tools may detect, and intercept known cybersecurity attacks. However, new and unknown security threats involving social engineering may not be readily detectable by such cyber security tools, and the organizations may have to rely on their employees (referred to as users) to recognize such threats. To enable their users to stop or reduce the rate of cybersecurity incidents, the organizations may conduct security awareness training for their users. The organizations may conduct security awareness training through a security awareness system, an in-house cybersecurity team and/or use third parties who are experts in matters of cybersecurity. The security awareness training may include cybersecurity awareness training via simulated attacks, computer-based training, and such training programs.

As a part of the security awareness training via simulated attacks, the security awareness system and/or a system administrator may use phishing templates for creating and delivering simulated phishing messages to the users.

BRIEF SUMMARY OF THE DISCLOSURE

In an example embodiment, a method for automated effective template generation includes identifying, by one or more servers, that a semantic similarity of a plurality of messages at least meets a similarity threshold, each of the plurality of messages reported by a plurality of users as a potentially malicious message, indexing, by the one or more servers, the plurality of messages under a common template identifier, determining, by the one or more servers, one or more messages of the plurality of messages indexed under the common template identifier has a report-to-reach ratio less than a report-to-reach threshold, and identifying, by the one or more servers responsive to the determination, the one or more messages to use for a simulated phishing template under the common template identifier.

In some implementations, the method includes using, by the one or more servers, a semantic similarity analyzer to compare message content of the plurality of messages to determine the semantic similarity.

In some implementations, the method includes using the semantic similarity analyzer to calculate a number of words that two messages of the plurality of messages have in common divided by the total number of words in the two messages divided by two.

In some implementations, the method includes determining, by the one or more servers, the semantic similarity of the plurality of messages by comparing one of common words, phrases, or structures in content of the plurality of messages.

In some implementations, wherein the similarity threshold comprises a percentage value that represents that the semantic similarity between two messages of the plurality of messages is sufficient, the two messages are categorized under the same common template identifier.

In some implementations, the method includes determining, by the one or more servers, the report-to-reach ratio of each message of the plurality of messages based on a ratio of the number of users who receive each message to the number of those users who report each message as being potentially malicious.

In some implementations, the method includes categorizing, by the one or more servers, the one or more messages into one or more user groups based at least on classification group criteria, the one or more user groups to be used for creating the simulated phishing template.

In some implementations, the method includes determining, by the one or more servers based on user demographics of the one or more messages, user information to use with the one or more messages to create the simulated phishing template.

In some implementations, the method includes creating, by the one or more servers, the simulated phishing template based on at least one of the one or more messages, the simulated phishing template selectable by an administrator for use in communicating simulated phishing messages to one or more users.

In some implementations, the method includes identifying, by the one or more servers, the plurality of reported messages and information about the plurality of users that reported the message from one or more databases storing reported messages and user information from one of a single organization or a plurality of organizations.

In an example embodiment, a system for automated effective template generation includes one or more servers. The one or more severs are configured to identify that a semantic similarity of a plurality of messages at least meets a similarity threshold, to identify each of the plurality of messages reported by a plurality of users as a potentially malicious message, to index the plurality of messages under a common template identifier, to determine one or more messages of the plurality of messages indexed under the common template identifier has a report-to-reach ratio less than a report-to-reach threshold, and to identify, responsive to the determination, the one or more messages to use for a simulated phishing template under the common template identifier.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 2B depicts an implementation of a system for automated effective template generation, according to one or more embodiments;

DETAILED DESCRIPTION

Figure 1A:
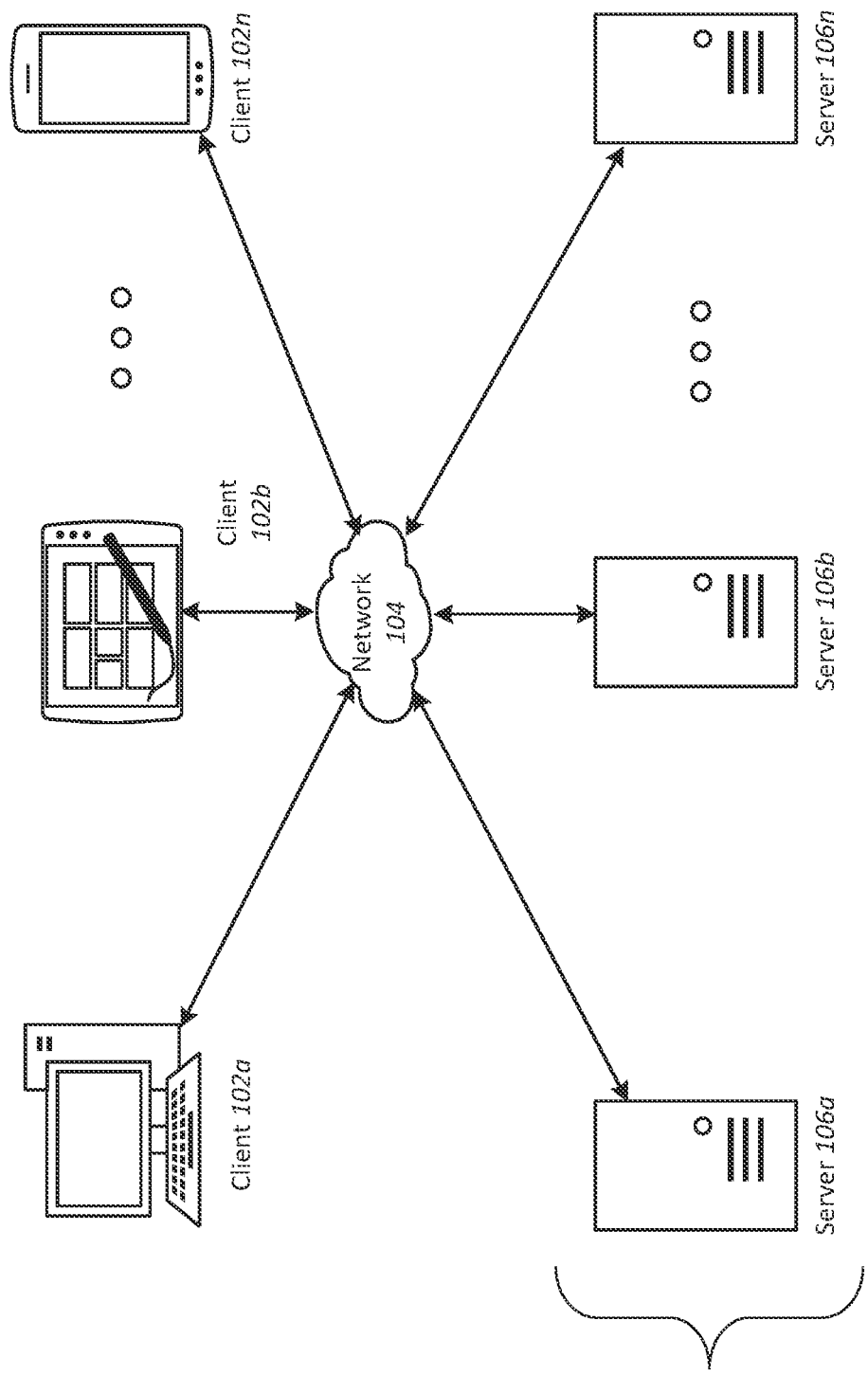
FIG. 1A is a block diagram depicting an embodiment of a network environment comprising client device in communication with server device.

Some simulated phishing messages may appear quite apparently abnormal and sometimes even out of context to the users they are sent to and are likely to raise suspicion because they are not like other messages the users are used to seeing. In such a case, users are likely to recognize these simulated phishing messages as out of the ordinary and report them without necessarily noticing the characteristics of the phishing attacks in them, thus defeating the purpose of using such simulated phishing messages for security awareness training for the users. With real phishing messages becoming more and more sophisticated and harder to detect, simulated phishing messages which are very recognizable to users as abnormal may not serve the purpose of preparing the users for more sophisticated phishing attacks.

In security awareness system 120, simulated phishing messages may be created using simulated phishing message templates (which may be referred to simply as "templates"). A template is a structure that is used to create simulated phishing messages. A template may contain fixed content including text and images and may additionally include dynamic content that may change depending on the recipient of a simulated phishing message generated using the template, such as the email address of the recipient, the salutation, or other information that is relevant to the recipient. A template may include one or more exploits designed to trick the recipient into interacting with a simulated phishing message created using the template. Templates may be designed to resemble known real phishing attacks so that they may be used to train users to recognize these real attacks.

One of the challenges for a security awareness system in creating effective templates (and/or a system administrator in choosing effective templates) is that it may not be known which templates are likely to seem the most normal to a user, a group of users, or to an entire organization. While the security awareness system and/or the system administrator may create or choose templates that are generally useful in creating simulated phishing messages to train users, there is currently no way for the security awareness system or the system administrator to know which templates may be used to create simulated phishing messages that most closely resemble messages that the user expects to receive, in order to provide the greatest training impact because the user needs to be more security aware to detect the simulated threats in the simulated phishing message. The system administrator may be an individual or team who oversees a security awareness system of an organization with responsibilities including configuring and managing simulated phishing campaigns and simulated attacks and managing any other element within the security awareness system.

For purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods that are useful for automated effective template generation.

A. Computing and Network Environment

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' may be a public network. In still another of these embodiments, networks 104 and 104' may both be private networks.

The network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel, or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network may vary widely and the network 104 can be a body area network (BAN), a personal area network (PAN), a local-area network (LAN), e.g., Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPV6), or the link layer. The network 104 may be a type of broadcast network, a telecommunications network, a data communication network, or a computer network.

In some embodiments, the system may include multiple, logically grouped servers 106. In one of these embodiments, the logical group of servers may be referred to as a server farm or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous-one or more of the servers 106 or machines 106 can operate according to one type of operating system platform (e.g., Windows, manufactured by Microsoft Corp. of Redmond, Washington), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if the servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open-source product whose development is overseen by Citrix Systems, Inc. of Fort Lauderdale, Florida; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, California.

Management of the machine farm may be de-centralized. For example, one or more servers 106 may comprise components, subsystems, and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
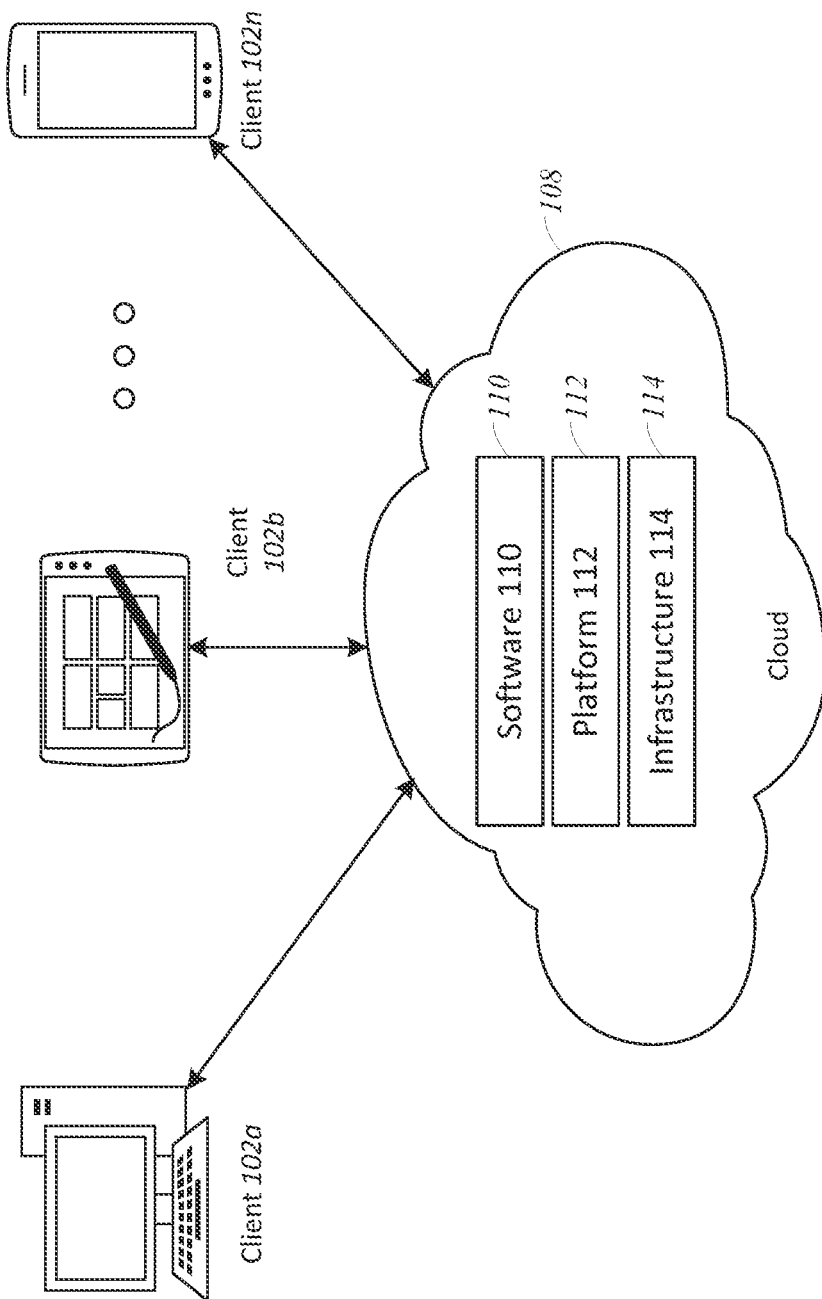
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or zero client may depend on the connection to the cloud 108 or server 106 to provide functionality. A zero client may depend on the cloud 108 or other networks 104 or servers 106 to retrieve operating system data for the client device 102. The cloud 108 may include back-end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients.

Private clouds may be connected to the servers 106 over a private network 104. Hybrid clouds 109 may include both the private and public networks 104 and servers 106.

The cloud 108 may also include a cloud-based delivery, e.g., Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers, or virtualization resources from large pools, allowing the users to quickly scale up by accessing more resources as needed. Examples of IaaS include Amazon Web Services (AWS) provided by Amazon, Inc. of Seattle, Washington, Rackspace Cloud provided by Rackspace Inc. of San Antonio, Texas, Google Compute Engine provided by Google Inc. of Mountain View, California, or RightScale provided by RightScale, Inc. of Santa Barbara, California. PaaS providers may offer functionality provided by IaaS, including, e.g., storage, networking, servers, or virtualization, as well as additional resources, e.g., the operating system, middleware, or runtime resources. Examples of PaaS include Windows Azure provided by Microsoft Corporation of Redmond, Washington, Google App Engine provided by Google Inc., and Heroku provided by Heroku, Inc. of San Francisco California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, California, or Office365 provided by Microsoft Corporation. Examples of SaaS may also include storage providers, e.g., Dropbox provided by Dropbox Inc. of San Francisco, California, Microsoft OneDrive provided by Microsoft Corporation, Google Drive provided by Google Inc., or Apple iCloud provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g., Google Chrome, Microsoft Internet Explorer, or Mozilla Firefox provided by Mozilla Foundation of Mountain View, California). Clients 102 may also access SaaS resources through smartphone or tablet applications, including e.g., Salesforce Sales Cloud, or Google Drive App. Clients 102 may also access SaaS resources through the client operating system, including e.g., Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

The client 102 and server 106 may be deployed as and/or executed on any type and form of computing device, e.g., a computer, network device or appliance capable of communicating on any type and form of network and performing the operations described herein.

Figure 1C:
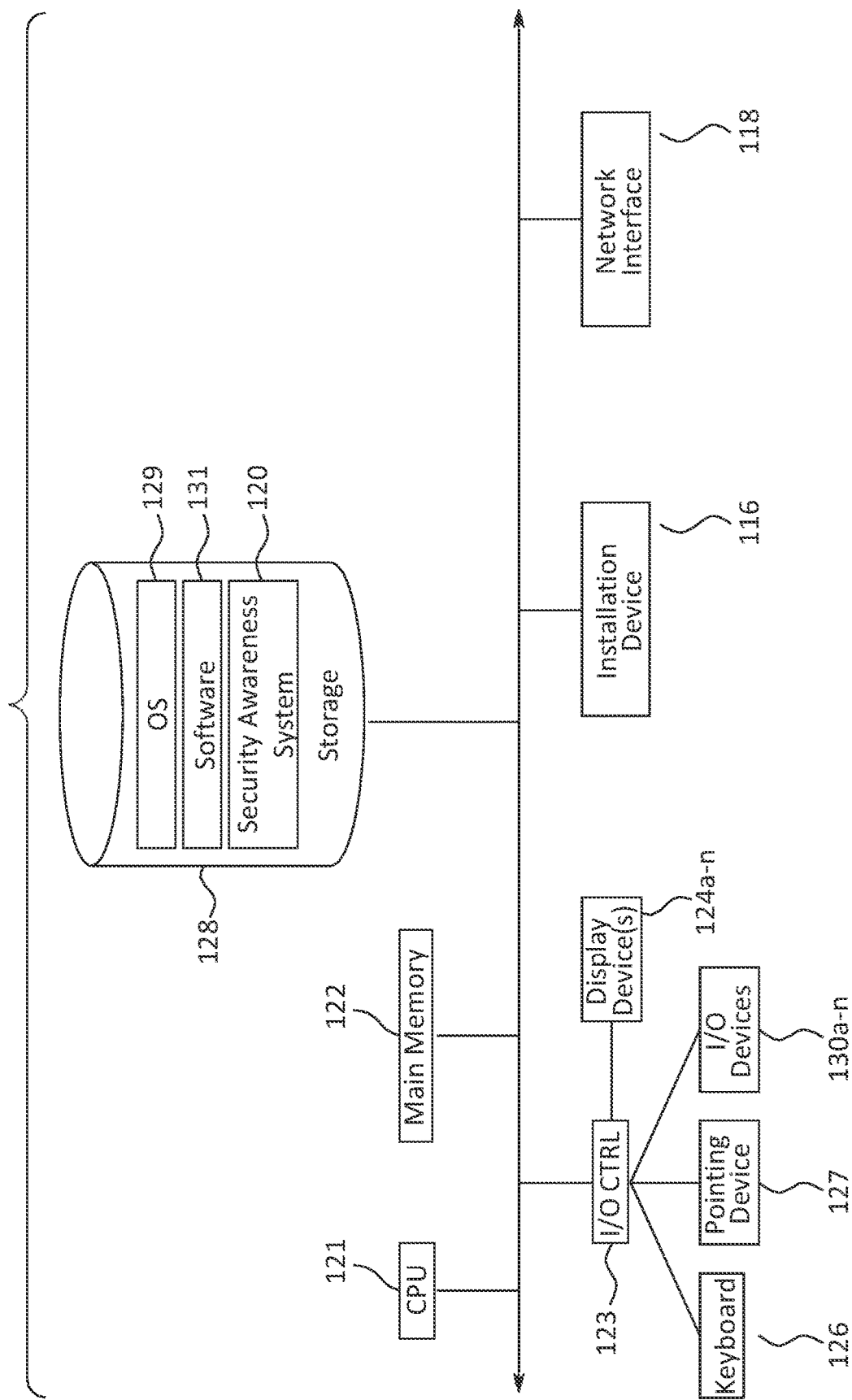
FIG. 1C and FIG. 1D are block diagrams depicting embodiments of computing devices useful in connection with the methods and systems described herein.
Figure 1D:
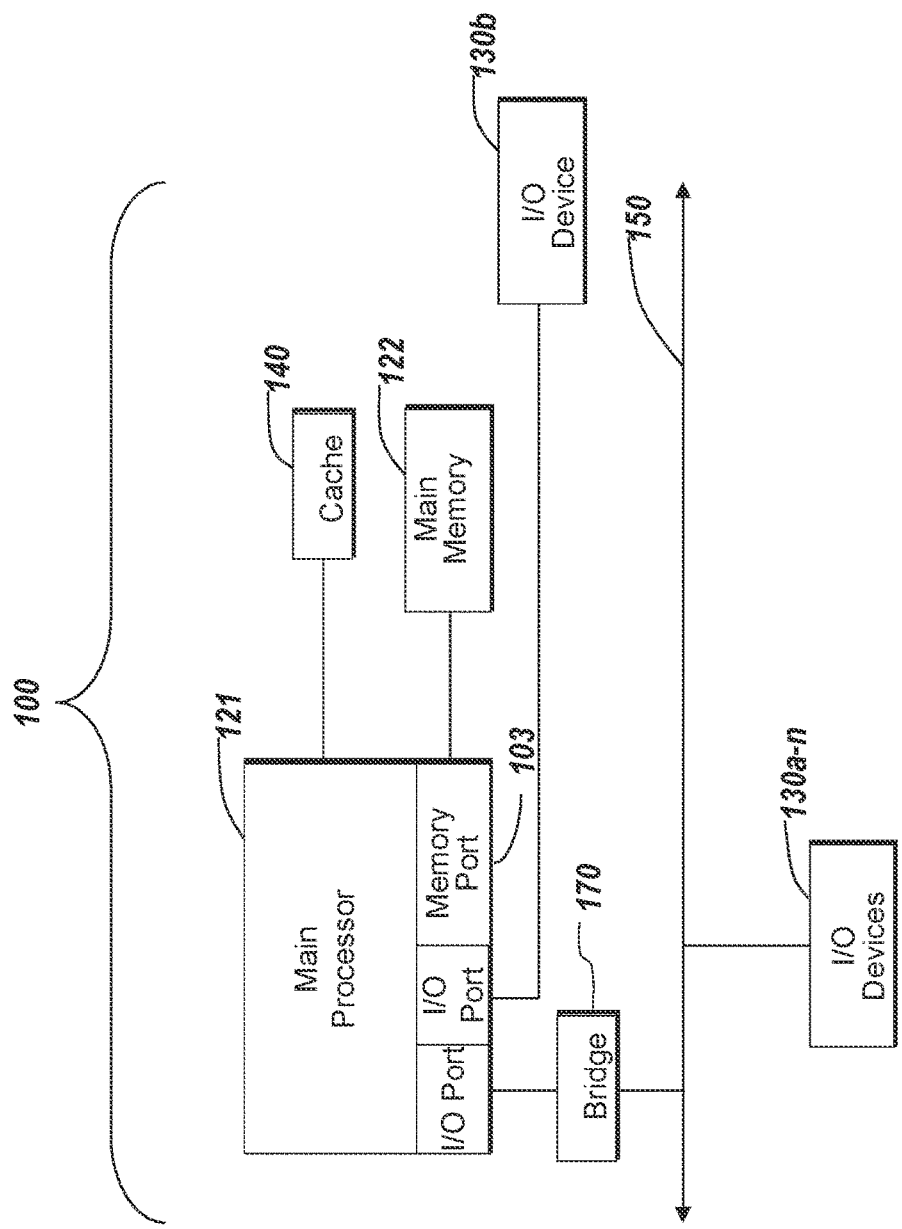

FIG. 1C and FIG. 1D depict block diagrams of a computing device 100 useful for practicing an embodiment of the client 102 or a server 106. As shown in FIG. 1C and FIG. 1D, each computing device 100 includes a central processing unit 121, and a main memory unit 122. As shown in FIG. 1C, a computing device 100 may include a storage device 128, an installation device 116, a network interface 118, and I/O controller 123, display devices 124a-124n, a keyboard 126 and a pointing device 127, e.g., a mouse. The storage device 128 may include, without limitation, an operating system 129, software 131, and a software of a simulated phishing attack system 120. As shown in FIG. 1D, each computing device 100 may also include additional optional elements, e.g., a memory port 103, a bridge 170, one or more input/output devices 130a-130n (generally referred to using reference numeral 130), and a cache memory 140 in communication with the central processing unit 121.

The central processing unit 121 is any logic circuitry that responds to, and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change read access memory (PRAM), conductive-bridging RAM (CBRAM), Silicon-Oxide-Nitride-Oxide- Silicon (SONOS), Resistive RAM (RRAM), Racetrack, Nano-RAM (NRAM), or Millipede memory. The main memory 122 may be based on any of the above-described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts and embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphic Port (AGP) to communicate with the display 124 or the I/O controller 123 for the display 124. FIG. 1D depicts and embodiment of a computer 100 in which the main processor 121 communicates directly with I/O device 130b or other processors 121' via HYPER-TRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen displays, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, a I/O device 130 may be a bridge between the system bus 150 and an external communication bus, e.g., a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect, or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments, software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g., one or more hard disk drives or redundant arrays of independent disks) for storing an operating system or other related software, and for storing application software programs such as any program related to the software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage devices 128 may be non-volatile, mutable, or read-only. Some storage devices 128 may be internal and connect to the computing device 100 via a bus 150. Some storage devices 128 may be external and connect to the computing device 100 via a I/O device 130 that provides an external bus. Some storage devices 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage devices 128 may also be used as an installation device 116 and may be suitable for installing software and programs. Additionally, the operating system and the software can be run from a bootable medium, for example, a bootable CD, e.g., KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, TI, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, the computing device 100 communicates with other computing devices 100' via any type and/or form of gateway or tunneling protocol e.g., Secure Socket Layer (SSL) or Transport Layer Security (TLS), or the Citrix Gateway Protocol manufactured by Citrix Systems, Inc. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Washington; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, or a NINTENDO DS, NINTENDO 3DS, NINTENDO WII, or a NINTENDO WII U device manufactured by Nintendo Co., Ltd., of Kyoto, Japan, or an XBOX 360 device manufactured by Microsoft Corporation.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g., the IPAD line of devices by Apple; GALAXY TAB family of devices by Samsung; or KINDLE FIRE, byAmazon.com, Inc. of Seattle, Washington. In other embodiments, the computing device 100 is an eBook reader, e.g., the KINDLE family of devices by Amazon.com, or NOOK family of devices by Barnes & Noble, Inc. of New York City, New York.

In some embodiments, the communications device 102 includes a combination of devices, e.g., a smartphone combined with a digital audio player or portable media player. For example, one of these embodiments is a smartphone, e.g., the iPhone family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g., a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems And Methods For Automated Effective Template Generation And Recommendation The following describes systems and methods for automated effective template generation. The following systems and methods may also be useful for automated effective template recommendation for selection. Security awareness system 120 may be a system that manages aspects relating to cybersecurity awareness for an organization. The organization may encompass all users (for example, employees, contractors, patrons, customers and/or consumers) within the organization, vendors to the organization, or partners of the organization. Security awareness system 120 may include a message interception and analysis component, a message reporting component, a simulated phishing component, a message modification component, a message extraction and replacement component, a risk score generation component, a template generation and recommendation component, and a gamification component. Security awareness system 120 may be an overarching description of a complete cybersecurity awareness system and may encompass items such as security awareness and training platform 202, threat reporting platform 204, and threat detection platform 206. Security awareness and training platform 202 may facilitate cybersecurity awareness training via simulated phishing campaigns, computer-based training, and risk score generation and tracking. Security awareness and training platform 202 is also referred to as SAT platform.

Every user who joins an organization may be added to an organization's account with security awareness and training platform 202. The users may be placed with other similar users into groups based on information about the user (user information), for example, their department, job function, manager's name, or their geographic work location. One of the aspects of security awareness and training platform 202 is to increase cybersecurity awareness of the users, in particular with respect to phishing attacks.

To increase the cybersecurity awareness of the users, one of the training methodologies used by security awareness and training platform 202 is to execute a simulated phishing campaign. A simulated phishing campaign is an organized combination of two or more simulated phishing messages where each simulated phishing message of the simulated phishing campaign interrelates with other simulated phishing messages of the simulated phishing campaign to increase the likelihood that a user will interact with one or more of the simulated phishing messages. A simulated phishing message may test a user to see if the user is likely to recognize a phishing message and act appropriately upon receiving one. Security awareness and training platform 202 may generate the simulated phishing messages employing same types of exploits as a malicious phishing message, that is, having one or more elements such as links, attachments, or macros of a phishing message, except that if a user interacts with a simulated phishing message or the one or more elements, there is no harm caused to the organization. Security awareness and training platform 202 can detect a user's interaction with a simulated phishing message and can inform the user that they fell for a phish (which had it been a malicious phishing message, would have posed a security risk to the organization). Security awareness system 120 may provide threat reporting platform 204, which enables users to report suspicious messages to a threat detection platform, which triages and analyzes the reported messages to determine which are malicious threats and which are benign.

A simulated phishing message may be based on a template, where the template may outline a structure and content of the simulated phishing message, potentially with areas of "dynamic content" that may be customized to a target user, for example, the user's email address, name, department, or other identifying information. The more a simulated phishing message appears genuine to the user, the more likely the user is to interact with the message, exposing themselves and/or the organization to security risks. The hardest simulated phishing messages for a user to detect are those that closely resemble messages that are expected by the user, and which would not typically pose any concern. In other words, an ideal simulated phishing message may be the one that was widely received but never or rarely reported. Simulated phishing messages that closely resemble messages that are expected by the user and do not raise suspicion are therefore a good choice for use simulated phishing campaigns. Currently, security awareness and training platform 202 or the system administrator may use any simulated phishing message templates for launching phishing campaigns. However, neither the security awareness and training platform 202 nor the system administrator may know which simulated phishing message templates may be used to create simulated phishing messages that closely resemble messages that a user or group of users expects to receive in order to provide the greatest training impact. The disclosure provides a system that determines and obtains simulated phishing message templates from databases that may be effective in training users or groups of users in recognizing malicious phishing messages. The obtained simulated phishing message templates may be provided to the security awareness system or the system administrator for conducting security awareness training.

Figure 2A:
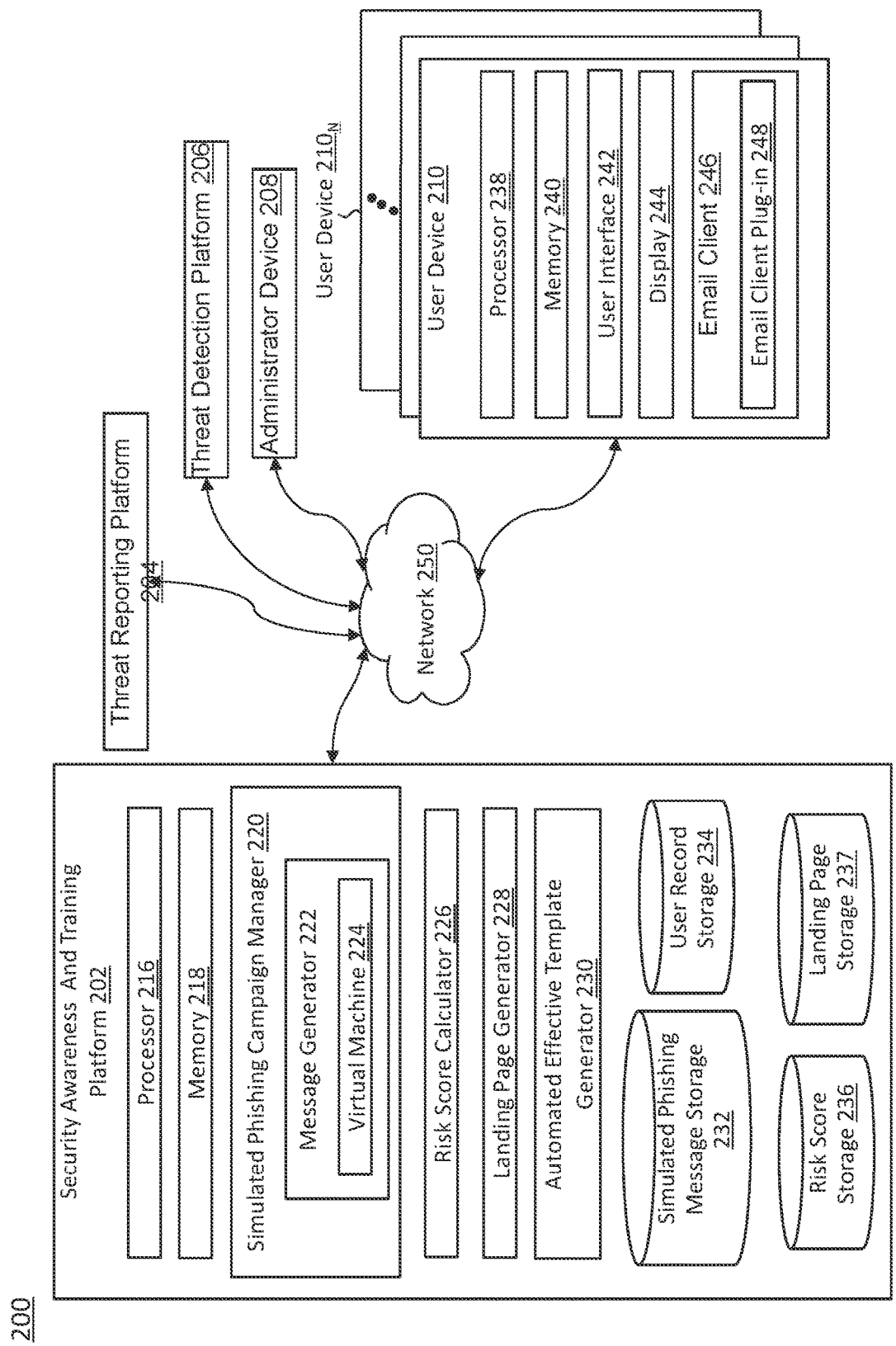
FIG. 2A depicts an implementation of some of a server architecture of an implementation of a system for managing aspects relating to cybersecurity awareness for an organization, according to one or more embodiments.

FIG. 2A depicts some of the server architecture of an implementation of system 200 for managing aspects relating to cybersecurity awareness for an organization, according to some embodiments. System 200 may be a part of security awareness system 120. System 200 may include security awareness and training platform 202, threat reporting platform 204, threat detection platform 206, administrator device 208, user device(s) 210, and network 250 enabling communication between the system components for information exchange. Network 250 may be an example or instance of network 104, details of which are provided with reference to FIG. 1A and its accompanying description.

According to some embodiments, each of security awareness and training platform 202, threat reporting platform 204 and threat detection platform 206 may be implemented in a variety of computing systems, such as a mainframe computer, a server, a network server, a laptop computer, a desktop computer, a notebook, a workstation, and the like. In an implementation, each of security awareness and training platform 202, threat reporting platform 204 and threat detection platform 206 may be implemented in a server, such as server 106 shown in FIG. 1A. In some implementations, security awareness and training platform 202, threat reporting platform 204 and threat detection platform 206 may be implemented by a device, such as computing device 100 shown in FIGS. 1C and 1D. In some embodiments, security awareness and training platform 202, threat reporting platform 204 and threat detection platform 206 may be implemented as a part of a cluster of servers. In some embodiments, each of security awareness and training platform 202, threat reporting platform 204 and threat detection platform 206 may be implemented across a plurality of servers, thereby, tasks performed by each of security awareness and training platform 202, threat reporting platform 204 and threat detection platform 206 may be performed by the plurality of servers. These tasks may be allocated among the cluster of servers by an application, a service, a daemon, a routine, or other executable logic for task allocation.

In one or more embodiments, security awareness and training platform 202 may facilitate cybersecurity awareness training via simulated phishing attacks. In some implementations, security awareness and training platform 202 may be owned or managed or otherwise associated with an organization or any entity authorized thereof. A simulated phishing attack is a technique of testing a user to see whether the user is likely to recognize a true malicious phishing attack and act appropriately upon receiving the malicious phishing attack. The simulated phishing attack may include links, attachments, macros, or any other simulated phishing threat that resembles a real phishing threat. In response to a user interaction with the simulated phishing attack, for example if the user clicks on a link (i.e., a simulated phishing link), the user may be provided with a security awareness training. In an example, security awareness and training platform 202 may be a Computer Based Security Awareness Training (CBSAT) system that performs security services such as performing simulated phishing attacks on a user or a set of users of the organization as a part of security awareness training.

According to some embodiments, security awareness and training platform 202 may include processor 216 and memory 218. For example, processor 216 and memory 218 of security awareness and training platform 202 may be CPU 121 and main memory 122 respectively as shown in FIGS. 1C and 1D. Further, security awareness and training platform 202 may include simulated phishing campaign manager 220. Simulated phishing campaign manager 220 may include various functionalities that may be associated with cybersecurity awareness training. In an implementation, simulated phishing campaign manager 220 may be an application or a program that manages various aspects of a simulated phishing attack, for example, tailoring and/or executing a simulated phishing attack. A simulated phishing attack may test the readiness of a user to handle phishing attacks such that malicious actions are prevented. For instance, simulated phishing campaign manager 220 may monitor and control timing of various aspects of a simulated phishing attack including processing requests for access to attack results, and performing other tasks related to the management of a simulated phishing attack.

In some embodiments, simulated phishing campaign manager 220 may include message generator 222 having a virtual machine 224. Message generator 222 may be an application, service, daemon, routine, or other executable logic for generating messages. The messages generated by message generator 222 may be of any appropriate format. For example, the messages may be email messages, text messages, short message service (SMS) messages, instant messaging (IM) messages used by messaging applications such as, e.g., WhatsApp™, or any other type of message. Message type to be used in a particular simulated phishing message may be determined by, for example, simulated phishing campaign manager 220. The messages may be generated in any appropriate manner, e.g., by running an instance of an application that generates the desired message type, such as running e.g. a Gmail® application, Microsoft Outlook™, WhatsApp™, a text messaging application, or any other appropriate application. The messages may be generated by running a messaging application on virtual machine 224 or may be run in any other appropriate environment. The messages may be generated to be in format consistent with specific messaging platforms, for example Outlook 365™, Outlook® Web Access (OWA), Webmail™, iOS®, Gmail®, and so on. In an implementation, message generator 222 may be configured to generate simulated phishing communications. The simulated phishing communications may be used in simulated phishing attacks or in simulated phishing campaigns.

Referring again to FIG. 2A, in some embodiments, security awareness and training platform 202 may include risk score calculator 226. Risk score calculator 226 may be an application or a program for determining and maintaining risk scores for users in an organization. A risk score of a user may be a representation of vulnerability of the user to a malicious attack. In an implementation, risk score calculator 226 may maintain more than one risk score for each user. Each such risk score may represent vulnerability of the user for a specific cyberattack. In an implementation, risk score calculator 226 may calculate risk scores for a group of users, the organization, an industry to which the organization belongs, a geography, and so on. In an example, a risk score of the user may be modified based on the user's responses to simulated phishing communications, completion of training by the user, a current position of the user in the organization, a size of a network of the user, an amount of time the user has held the current position in the organization, and/or any other attribute that can be associated with the user.

According to some embodiments, security awareness and training platform 202 may include landing page generator 228. In an implementation, landing page generator 228 may be an application or a program for creation or modification of landing pages to facilitate security awareness training of users in the organization. In an example, a landing page may be a webpage or an element of webpage that appears in response to a user interaction such as clicking on a link, downloading an attachment or such actions to provision training materials.

According to some embodiments, security awareness and training platform 202 may include an automated effective template generator 230. Automated effective template generator 230 may be a computational system that automatically analyzes existing databases to extract and populate a database with simulated phishing message templates that may be effective in training users or groups of users in recognizing malicious phishing messages (explained in greater detail in FIG. 2B). Automated effective template generator 230 may use the simulated phishing message templates to generate other templates that are semantically similar. Automated effective template generator 230 may recommend and/or provide generated templates to the system administrators and/or simulating phishing campaign manager 220 of security awareness and training platform 202 to generate simulated phishing campaigns for a user or group of users that have characteristics that are aligned with the characteristics of the users or groups of users that the template was shown to be effective against.

In some embodiments, security awareness and training platform 202 may include simulated phishing message storage 232, user record storage 234, risk score storage 236, and landing page storage 237. In an implementation, simulated phishing message storage 232 may store simulated phishing communication templates, and user record storage 234 may store one or more contextual parameters for each user of an organization. A contextual parameter for a user may include information associated with the user that may be used to make a simulated phishing communication more relevant to that user. In an example, one or more contextual parameters for a user may include one or more of the following-language spoken by the user, locale of the user, temporal changes (for example, time at which the user changes the locale), job title of the user, job department of the user, religious belief of the user, topic of communication, subject of communication, name of manager or subordinate of the user, industry, address (for example, Zip Code and street), name or nickname of the user, subscriptions, preferences, recent browsing history, transaction history, recent communications with peers/manager/human resource partner/banking partner, regional currency and units, and any other information associated with the user. Further, risk score storage 236 may store risk scores of users of an organization and landing page storage 237 may store landing page templates. The simulated phishing communication templates stored in simulated phishing message storage 232, the one or more contextual parameters for the users stored in user record storage 234, the risk scores of the users stored in risk score storage 236, and the landing page templates stored in landing page storage 237 may be periodically or dynamically updated as required. For example, automated effective template generator 230 may update simulated phishing message storage 232 with most effective templates, using which messages in simulated phishing message storage 232 may be updated based on the effective templates.

Referring again to FIG. 2A, in one or more embodiments, user device(s) 210 may be any device used by a user. The user may be an employee of an organization or any entity. According to some embodiment, user device(s) 210 may include processor 237 and memory 240. In an example, processor 238 and memory 240 of user device(s) 210 may be CPU 121 and main memory 122, respectively, as shown in FIGS. 1C and 1D. User device(s) 210 may also include user interface 242 such as a keyboard, a mouse, a touch screen, a haptic sensor, voice-based input unit, or any other appropriate user interface. It shall be appreciated that such components of user device(s) 210 may correspond to similar components of computing device 100 in FIGS. 1C and 1D, such as keyboard 126, pointing device 127, I/O devices 130a-n and display devices 124a-n. User device(s) 210 may also include display 244, such as a screen, a monitor connected to the device in any manner, or any other appropriate display. In an implementation, user device(s) 210 may display received content (for example, simulated phishing communications) for the user using display 244 and is able to accept user interaction via user interface 242 responsive to the displayed content.

Referring again to FIG. 2A, in some embodiments, user device(s) 210 may include email client 246. In one example implementation, email client 246 may be an application installed on user device(s) 210. In another example implementation, email client 246 may be an application that can be accessed over network 250 through a browser without requiring to be installed on user device(s) 210. In an implementation, email client 246 may be any application capable of composing, sending, receiving, and reading emails messages. For example, email client 246 may be an instance of an application, such as Microsoft Outlook™ application, IBM® Lotus Notes® application, Apple® Mail application, Gmail® application, or any other known or custom email application. In an implementation, email client 246 may be configured to receive simulated phishing communications from security awareness and training platform 202. In an example, a user of user device(s) 210 may be mandated to download and install email client 246 by the organization. In another example, email client 246 may be provided by the organization as default. In some examples, a user of user device(s) 210 may select, purchase and/or download email client 246, through for example, an application distribution platform. The term "application" as used herein may refer to one or more applications, services, routines, or other executable logic or instructions.

In one or more embodiments, email client 246 may include email client plug-in 248. An email client plug-in may be an application program that may be added to an email client for providing one or more additional features to enable customization. The email client plug-in may be provided by the same entity that provides the email client software or may be provided by a different entity. In an example, email client plug-in may include plug-ins providing a User Interface (UI) element such as a button to trigger a function. Functionality of client-side plug-ins that use a UI button may be triggered when a user clicks the button. Some examples of client-side plug-ins that use a button UI include, but are not limited to, a Phish Alert Button (PAB) plug-in, a task create plug-in, a spam marking plug-in, an instant message plug-in, a social media reporting plug-in and a search and highlight plug-in. In an embodiment, email client plug-in 248 may be any of the aforementioned types or may be of any other type.

In some implementations, email client plug-in 248 may not be implemented in email client 246 but may coordinate and communicate with email client 246. In some implementations, email client plug-in 248 is an interface local to email client 246 that supports email client users. In one or more embodiments, email client plug-in 248 may be an application that supports the user, i.e., recipients of simulated phishing communications, to select to report suspicious simulated phishing communications that they believe may be a threat to them or their organization. Other implementations of email client plug-in 248 not discussed here are contemplated herein. In one example, email client plug-in 248 may provide the PAB plug-in through which functions or capabilities of email client plug-in 248 are triggered/activated by a user action on the button. Upon activation, email client plug-in 248 may forward content (for example, suspicious simulated phishing communications) to a security administrator. In some embodiments, email client plug-in 248 may cause email client 246 to forward content to the system administrator, or an Incident Response (IR) team of the organization for threat triage or threat identification. In some embodiments, email client 246 or email client plug-in 248 may send a notification to security awareness and training platform 202 that a user has reported content received at email client 246 as potentially malicious. Thus, the PAB plug-in enables a user to report suspicious content.

FIG. 2B depicts an implementation of a system 290 for automated effective template generation, according to one or more embodiments. Security awareness system 120 may implement automated effective template generator 230 as a part of security awareness and training platform 202. System 290 may include automated effective template generator 230, administrator device 208, and network 250 enabling communication between the system components for information exchange. Network 250 may be an example or instance of network 104, details of which are provided with reference to FIG. 1A and its accompanying description.

Automated effective template generator 230 may be a computational system that automatically analyzes existing databases (explained in greater detail below) to extract and populate a database with simulated phishing message templates that may be effective in training users or groups of users in recognizing malicious phishing messages. According to one or more embodiments, automated effective template generator 230 may be implemented in a variety of computing systems, such as a mainframe computer, a server, a network server, a laptop computer, a desktop computer, a notebook, a workstation, and any other computing system. In an implementation, automated effective template generator 230 may be implemented in a server, such as server 106 shown in FIG. 1A. In some implementations, automated effective template generator 230 may be implemented by a device, such as computing device 100 shown in FIGS. 1C and 1D. In some embodiments, automated effective template generator 230 may be implemented as a part of a cluster of servers. In some embodiments, automated effective template generator 230 may be implemented across a plurality of servers, thereby, tasks performed by automated effective template generator 230 may be performed by the plurality of servers. These tasks may be allocated among the plurality or cluster of servers by an application, a service, a daemon, a routine, or other executable logic for task allocation. Automated effective template generator 230 may comprise a program, service, task, script, library, application or any type and form of executable instructions or code executable on one or more processors. Automated effective template generator 230 may be implemented by one or more modules, applications, programs, services, tasks, scripts, libraries, applications, or executable code.

Automated effective template generator 230 may include processor 252 and memory 254. For example, processor 252 and memory 254 of automated effective template generator 230 may be CPU 121 and main memory 122, respectively, as shown in FIGS. 1C and 1D. Automated effective template generator 230 may include global user information database 256, global reported message database 258, one or more local user information database(s) 2601-N, one or more local reported message database(s) 2621-N, semantic similarity analyzer 264, report-to-reach analyzer 266, user grouping engine 268, template database 270 and a recommendation unit 272.

Global user information database 256 may be a database having information on all users across all organizations associated with security awareness system 120. In some examples, global user information database 256 may include user information which is either provided to security awareness and training platform 202, such as user fields, or information gathered by security awareness and training platform 202, such as user events. Some examples of the user fields include first name, last name, location, language used in communication, manager, manager's email, email aliases, primary email, job title, phone number, phone number's extension, mobile phone number, division, employee number (number), employee number (text), phish-prone percentage, risk score, organization, department, language, groups, and such information. Some examples of user events include general user events, phishing test-related events, vishing test-related events, training-related events, and other user events. The user information may be included in a user's timeline. The user timeline may provide a complete history of user's phishing tests, related emails, and training. In one or more embodiments, the security awareness and training platform may create the user's timeline beginning from addition of the user into an organization's account. The user timeline may include security awareness and training platform events in addition to a timestamp associated with each event.

Global reported message database 258 may be a database having information of messages reported by all users across all organizations associated with security awareness and training platform 202. Security awareness and training platform 202 or the system administrator may have executed one or more simulated phishing campaigns on users of various organizations. Each of the simulated phishing campaigns may have one or more simulated phishing messages (hereinafter referred to as messages). Some of the users may have suspected the messages as malicious and may have reported the messages. Global reported message database 258 may have information and records of all reported messages and information associated with the users who reported them.

Local user information database(s) 2601-N may be database(s) having information of the users from the system administrator's organization(s). In some examples, there may be more than one local user information database 260 associated with the system administrator's organization. The system administrator's organization may span a region, area, country, or may be segmented based on any such classification, and each segment of the system administrator's organization may have a local user information database 260. For example, a local user information database 260 may be associated with system administrator's organization for America region, may have information of the users in the country/region of America for an organization. Similar to global user information database 256, local user information database(s) 2601-N may include any information about the user which is either provided to security awareness and training platform 202, such as user fields, or information gathered by security awareness and training platform 202, such as user events. The user information may be included in the user's timeline.

Local reported message database(s) 2621-N may be database(s) having messages and/or information of messages reported by the users from the system administrator's organization(s). For each local user information database 2601-N, there may be local reported message database(s) 2621-N associated with the corresponding system administrator's organization. In examples, there may be a local user information database 260 and a local reported message database 262 for each organization that utilizes security awareness and training platform 202.

Semantic similarity analyzer 264 may be a program or application configured to calculate a semantic similarity between messages. In some examples, semantic similarity analyzer 264 may compare content of messages to determine the semantic similarity. In some examples, semantic similarity analyzer 264 may determine the similarity of the messages using a semantic similarity function that compares message content and tracks common words, phrases, and structures. In some examples, semantic similarity analyzer 264 may determine semantic similarity of two messages by calculating a number of words that two messages of the plurality of messages have in common, divided by the total number of words in the two messages, divided by two. In some examples, semantic similarity analyzer 264 may provide the semantic similarity results in terms of percentage. For example, semantic similarity analyzer 264 may provide a result that message A is 91% semantically similar to message B. Message similarity may be characterized by thresholds of semantic similarity, such as 90% or more, 80% or more, 80% or more, etc.

Report-to-reach analyzer 266 may be a program or application configured to track and determine the plurality of messages with a report-to-reach ratio less than a report-to-reach threshold set by the system administrator. The report-to-reach ratio is a metric that represents the proportion of users that detect a message as being suspicious, out of all the users that receive the message. If a very small proportion of users that receive a message do not consider it to be suspicious, then that may be an indication that a simulated phishing message that is similar to the message may be difficult to detect as a potential threat. Therefore, the simulated phishing test may be more challenging and more likely to be effective in training users to recognize genuine phishing messages. The report-to-reach ratio may be calculated as a ratio between a number of users who receive a message and the number of those users who report the message as being malicious. For example, the report-to-reach ratio is provided by:

$$\text{Report-to-reach Ratio}_{message} = \frac{\text{\# of users who reported the message}}{\text{\# of users who were sent the message}}.$$

A larger report-to-reach ratio may indicate that the messages were often reported by users to be suspicious, whereas a low report-to-reach ratio may indicate that the messages were received by a large population of users, but only reported by a small subset of that group. A report-to-reach threshold may be a report-to-reach ratio that is declared as sufficient to indicate that a message or plurality of messages may be used to generate an effective simulated phishing message template. In such a case, a report-to-reach ratio that is below the report-to-reach threshold for a message may indicate that the message or plurality of messages may be used to generate an effective template.

User grouping engine 268 may be a program or application configured to create classification group criteria. Classification group criteria are common characteristics of a group of users that either reported a message or did not report a message. Examples of classification group criteria include job title, job function, location, seniority, or department. Classification group criteria may also include temporal parameters, such as the length of employment at the organization, length of time since receiving security awareness training, length of time since reporting a suspicious message, length of time since interacting with a simulated phishing message or an actual phishing message, etc. User grouping engine 268 may be configured to categorize the one or more messages determined by report-to-reach analyzer 266 as having a sufficiently low report-to-reach ratio as being associated with one or more user groups based at least on classification group criteria. For example, user grouping engine 268 may categorize a subset of messages as being effective for users with one or more characteristics in common, which means that simulated phishing messages created using templates generated from the subset of messages are least likely to be detected by the user with those characteristics (and therefore most likely to be effective). In one or more embodiments, user grouping engine 268 may create a selection of classification group criteria, which are user criteria identified as being in common amongst the users that the generated template may be effective with. Using the classification group criteria, user grouping engine 268 may associate one or more generated templates with corresponding classification group criteria of the users (or user demographics) they may be effective on. For example, user grouping engine 268 may associate a template that is generated from a message that is widely received but infrequently reported by Information Technology (IT) department, as being effective with users having an IT department job title in their classification group criteria. Using classification group criteria, user grouping engine 268 may group the one or more messages with users sharing the same manager, job title, location, or other user information.

In some examples, user grouping engine 268 may indicate that messages from certain domains have a different report-to-reach ratio for certain user demographics. For example, messages that appear to be from Microsoft may be less frequently reported by users in the IT department, compared to another department such as Human Resources. In the example, user grouping engine 268 may associate one or more messages with corresponding classification group criteria of the user demographics they are most effective on, that is: IT department. User grouping engine 268 may associate the one or more messages with a domain of the one or more message sender (e.g., @microsoft.com, @VENDOR_NAME.com, @ORGANIZATION_NAME.com), subject field, and content that may be useful for generating templates and store the messages with information such as domain name in template database 270. Automated effective template generator 230 may store one or more generated templates associated with one or more classification group criteria in template database 270. In some examples, the one or more templates stored in template database 270 may be associated with classification group criteria of the user demographic that the template may be most effective with. In other examples, the one or more templates stored in template database 270 may be ranked as to their likely effectiveness against various classification group criteria, including but not limited to the classification group criteria that the template may be most effective for. In some embodiments, automated effective template generator 230 may use the ranked templates to generate other templates that are semantically similar which may also be effective for users with the same classification group criteria as the ranked templates.

In one or more embodiments, recommendation unit 272 may recommend the generated templates to the system administrators and/or simulating phishing campaign manager 220 of security awareness and training platform 202 to generate simulated phishing campaigns for a user or group of users that have characteristics that are aligned with the characteristics of the users or groups of users that the template may be effective against. In examples, recommendation unit 272 may provide recommendations of templates to a system administrator based on the classification group criteria of the user or group of users the system administrator is creating a simulated phishing campaign for. In other examples, recommendation unit 272 may create a bank of recommended templates by obtaining one or more templates categorized as effective for one or more classification group criteria, and store information identifying the bank of recommended templates in template database 270.

In some examples, recommendation unit 272 may use a ranking technique to rank the recommended list of generated templates based on their effectiveness. In some examples, recommendation unit 272 may recommend a list of generated templates without any ranking. In some examples, recommendation unit 272 may provide recommendations when the system administrator and/or simulating phishing campaign manager 220 searches for templates for creation of simulated phishing campaign. In some examples, recommendation unit 272 may provide recommendations for system administrators and/or simulating phishing campaign manager 220 to create simulated phishing messages using the templates. When system administrators and/or simulating phishing campaign manager 220 may accept the recommendation of a template, recommendation unit 272 may provide one or more semantically similar templates in a further recommendation, from which the system administrators may select a further template for use in creating simulated phishing messages and/or simulated phishing campaign.

Referring back to FIG. 2B, in some embodiments, administrator device 208 may be any device used by an administrator to perform administrative duties. Administrator device 208 may be any computing device, such as a desktop computer, a laptop, a tablet computer, a mobile device, a Personal Digital Assistant (PDA), smart glasses, or any other computing device. In an implementation, administrator device 208 may be a device, such as client device 102 shown in FIG. 1A and FIG. 1B. Administrator device 208 may be implemented by a device, such as computing device 100 shown in FIG. 1C and FIG. 1D. According to some embodiments, administrator device 208 may include processor 274 and memory 276. In an example, processor 274 and memory 276 of administrator device 208 may be CPU 121 and main memory 122, respectively, as shown in FIG. 1C and FIG. 1D. Administrator device 208 may also include user interface 278, such as a keyboard, a mouse, a touch screen, a haptic sensor, a voice-based input unit, or any other appropriate user interface. It shall be appreciated that such components of administrator device 208 may correspond to similar components of computing device 100 in FIG. 1C and FIG. 1D, such as keyboard 126, pointing device 127, I/O devices 130*a-n* and display devices 124*a-n*. Administrator device 208 may also include display 280, such as a screen, a monitor connected to the device in any manner, a wearable glass, or any other appropriate display. In an implementation, administrator device 208 may display received content (for example, template) for the user using display 280 and is able to accept user interaction via user interface 278 responsive to the displayed content.

In some implementations, administrator device 208 may include a communications module (not shown). This may be a library, an application programming interface (API), a set of scripts, or any other code that may facilitate communications between administrator device 208 and automated effective template generator 230. In some embodiments, the communications module may determine when to transmit information from administrator device 208 to external servers via network 250. In some embodiments, the communications module receives information from security automated effective template generator 230, via network 250. In some embodiments, the information transmitted or received by the communications module may correspond to a message, such as an email, generated or received by a messaging application.

In an implementation, administrator device 208 may include a messaging application (not shown). A messaging application may be any application capable of viewing, editing, and/or sending messages. For example, a messaging application may be an instance of an application that allows viewing of a desired message type, such as any web browser, a Gmail™ application (Google, Mountain View, California), Microsoft Outlook™ (Microsoft, Mountain View, California), WhatsApp™ (Facebook, Menlo Park, California), a text messaging application, or any other appropriate application. In some embodiments, messaging application can be configured to display electronic training.

To generate effective simulated phishing message templates for simulated phishing messages, for example for use in simulated phishing campaigns, automated effective template generator 230 may use at least one technique of two techniques. Automated effective template generator 230 may apply a first technique when an organization does not have a user population above a headcount threshold for a threat reporting platform to generate enough templates from reported messages to be representative of user demographics. In one example, the headcount threshold may be defined to be less than or equal to 100 users. In some examples, automated effective template generator 230 may apply the first technique for small scale organizations having a number of users less than the headcount threshold where user diversity is insufficient to generate effective templates for specific user demographics. In the first technique, automated effective template generator 230 may utilize global user information database 256 in conjunction with global reported message database 258 to obtain effective simulated phishing message templates. The global user information database 256 and global reported message database 258 include reported messages for all organizations utilizing security awareness system 120. In this way, automated effective template generator 230 can utilize information from many organizations to associate classification group criteria with templates to determine which users or user groups they may be effective for.

Automated effective template generator 230 may apply a second technique of the two techniques when an organization has a user population above the headcount threshold. In some examples, automated effective template generator 230 uses the second technique for large scale organizations having a number of users more than the headcount threshold, as the user population of such organizations provide sufficient user diversity to identify effective templates for specific user demographics. Automated effective template generator 230 may obtain sufficient information in local user information database 260 to associate effective templates with user characteristics, and to make recommendations of templates on that basis it may be likely the recommendations are more appropriate for that organization. The second technique may utilize that organization's local user information database(s) 2601-N in conjunction with that organization's corresponding local reported message database(s) 2621-N to associate classification group criteria with templates to determine which users or user groups they may be effective for. The local user information database(s) 2601-N and local reported message database(s) 2621-N include user information and reported messages generated by the system administrator's organization.

In some examples, automated effective template generator 230 may utilize global user information database 256 in conjunction with global reported message database 258, and local user information database(s) 2601-N in conjunction with local reported message database(s) 2621-N, to associate simulated phishing message templates with classification group criteria. Although automated effective template generator 230 is described with respect to the (single) organization, automated effective template generator 230 can be implemented utilizing the plurality of reported messages and the plurality of users from one or more local user information database(s) 2601-N storing user information and local reported message database(s) 2621-N from a plurality of organizations. Automated effective template generator 230 may process user information and reported message data from either global user information database 256 and global reported message database 258 or local user information database(s) 2601-N and local reported message database(s) 2621-N as described below in FIG. 3 and FIG. 4 or can process user information and reported message data from both global and local databases.

Figure 3:
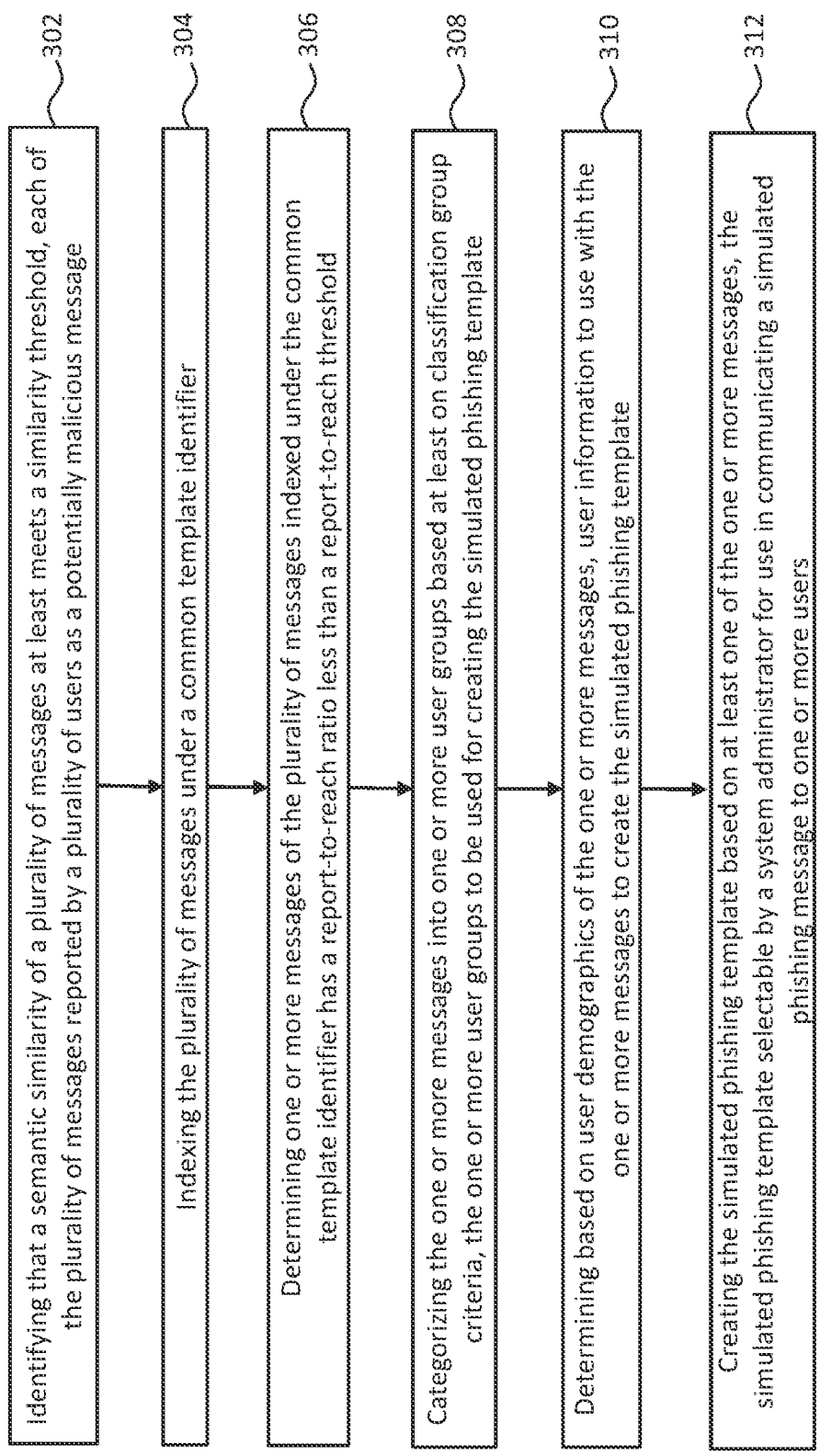
FIG. 3 depicts an implementation of a method for automated effective template generation, according to one or more embodiments.

Referring to FIG. 3 in a general overview, FIG. 3 depicts an implementation of a method for automated effective template generation, according to one embodiment. The method of FIG. 3 may be performed by automated effective template generator 230. In a brief overview of an implementation of process flow 300, at step 302, it may be identified that a semantic similarity of a plurality of messages at least meets a similarity threshold, each of the plurality of messages reported by a plurality of users as a potentially malicious message. At step 304, the plurality of messages may be indexed under a common template identifier. At step 306, one or more messages of the plurality of messages indexed under the common template identifier having a report-to-reach ratio less than a report-to-reach threshold may be determined. At step 308, the one or more messages may be categorized into one or more user groups based at least on classification group criteria, the one or more user groups to be used for creating the simulated phishing template. At step 310, based on user demographics of the one or more messages, user information to use with the one or more messages may be determined to create the simulated phishing template. At step 312, the simulated phishing template based on at least one of the one or more messages may be created. The simulated phishing template may be selectable by a system administrator for use in communicating a simulated phishing messages to one or more users.

In one or more embodiments, automated effective template generator 230 identifies the plurality of reported messages and the plurality of users from one or more databases storing user information and reported messages from one of a local organization or a global organization. For example, automated effective template generator 230 may use the user information and reported message data from either global user information database 256 and global reported message database 258 or local user information database(s) 2601-N and local reported message database(s) 2621-N for further processing described in following steps. Step 302 includes identifying that a semantic similarity of a plurality of messages at least meets a similarity threshold. In some examples, each of the plurality of templates is associated with messages reported by a plurality of users as a potentially malicious message. The similarity threshold may include a percentage value that represents a minimum semantic similarity between two messages of the plurality of template that is sufficient that the two messages are categorized under the same common template identifier. In one example, the similarity threshold may be set by the system administrator. In another example, the similarity threshold may be set by security awareness system 120. In one or more embodiments, automated effective template generator 230 may use semantic similarity analyzer 264 to compare content of the plurality of messages to determine the semantic similarity. In some examples, semantic similarity analyzer 264 may determine the similarity of two messages using a semantic similarity function that compares content and tracks common words, phrases, and structures. In some examples, semantic similarity analyzer 264 may determine semantic similarity of two messages by calculating a number of words that two messages of the plurality of messages have in common divided by the total number of words in the two messages divided by two. In some examples, a highest degree of semantic similarity may be found in the messages that are exactly the same except for recipient-specific features, such as the email address in the "to:" field or salutation (e.g., Dear Alice). Other known methods of determining the semantic similarity between two messages not disclosed are contemplated herein. When reported messages exceed the similarity threshold set by the system administrator, semantic similarity analyzer 264 may group the semantically similar messages.

Step 304 includes indexing the plurality of messages under a common template identifier. In examples, messages that exceed the similarity threshold may be indexed under a common template identifier. In one or more embodiments, semantic similarity analyzer 264 may index the plurality of messages. In some examples, semantic similarity analyzer 264 may organize the plurality of messages under one or more indices. In some examples, semantic similarity analyzer 264 may use the common template identifier as the index.

Step 306 includes determining one or more messages of the plurality of messages indexed under the common template identifier having a report-to-reach ratio less than a report-to-reach threshold. In examples, a different report-to-reach threshold may apply to each group of messages indexed under the common template identifier. In one or more embodiments, automated effective template generator 230 may use report-to-reach analyzer 266 to determine the report-to-reach ratio of each message of the plurality of messages based on a number of users who receive each message, to the number of those users who report each message as being potentially malicious. In some examples, report-to-reach analyzer 266 may determine one or more messages of the plurality of messages with a report-to-reach ratio less than the report-to-reach threshold set by the system administrator. In some examples, a low report-to-reach ratio may be associated with messages that were received by a large population of users, but only reported by a small subset of that group. A low report-to-reach ratio may indicate that messages in this format are viewed by a substantial number of users and considered non-threatening.

Step 308 includes categorizing the one or more messages with one or more classification group criteria. In some examples, one or more messages are associated with one or more classification group criteria to determine the user demographics of one or more user groups that the generated template is likely to be effective for when the generated template is used for creating simulated phishing messages. In one or more embodiments, automated effective template generator 230 may use user grouping engine 268 to associate the one or more templates with one or more classification group criteria. In examples, using these classification group criteria, user grouping engine 268 may associate one or more messages with corresponding classification group criteria of the user demographics they are least often reported by. Using the previous example, user grouping engine 268 may associate a generated template with a classification group criterion "IT department", that is users that belong to IT departments are likely to be among the groups of users that that the generated template is likely to be effective for when used for creating simulated phishing messages. In another example, user grouping engine 268 may associate a message about sales commissions with classification group criterion "finance" (which may be a characteristic of members of the finance team) to indicate user demographics of a user group the generated template is likely to be effective against when used for creating simulated phishing messages.

Step 310 includes creating one or more templates based on user demographics and associating the one or more generated templates based on the common template identifier with one or more classification group criteria of the common template identifier. In some examples, the one or messages are grouped with the user information. In an example, user grouping engine 268 may associate generated templates with the classification group criterion which is associated with users for which the templates are likely to be effective with.

Step 312 includes creating the simulated phishing template based on at least one of the one or more messages. In examples, simulated phishing campaign manager 220 may receive a selection of a template for use in a simulated phishing campaign. In some examples, automatic effective template generator 230 provides recommended templates for selection to a system administrator and/or security awareness and training platform 202 for use in a simulated phishing campaign. In one or more embodiment, recommendation unit 272 may provide a ranking of the simulated phishing templates provided for selection to a system administrator or security awareness and training platform 202, such that the highest ranked template is displayed first or most prominently. In some examples, the ranked order may be determined based on the percent similarity of the recommended template to the template that has been determined by automatic effective template generator 230 to be the most effective template of the classification group criteria used for the simulated phishing campaign. In some examples, recommendation unit 272 may provide a ranking of the simulated phishing templates provided for selection to a system administrator or security awareness and training platform 202 based on the rank of the templates in template database 270. In examples, automatic effective template generator 230 may receive a selection of a template for use in a simulated phishing campaign. The selection may be made by security awareness and training platform 202 or, in examples, the selection may be made by a system administrator.

Figure 4:
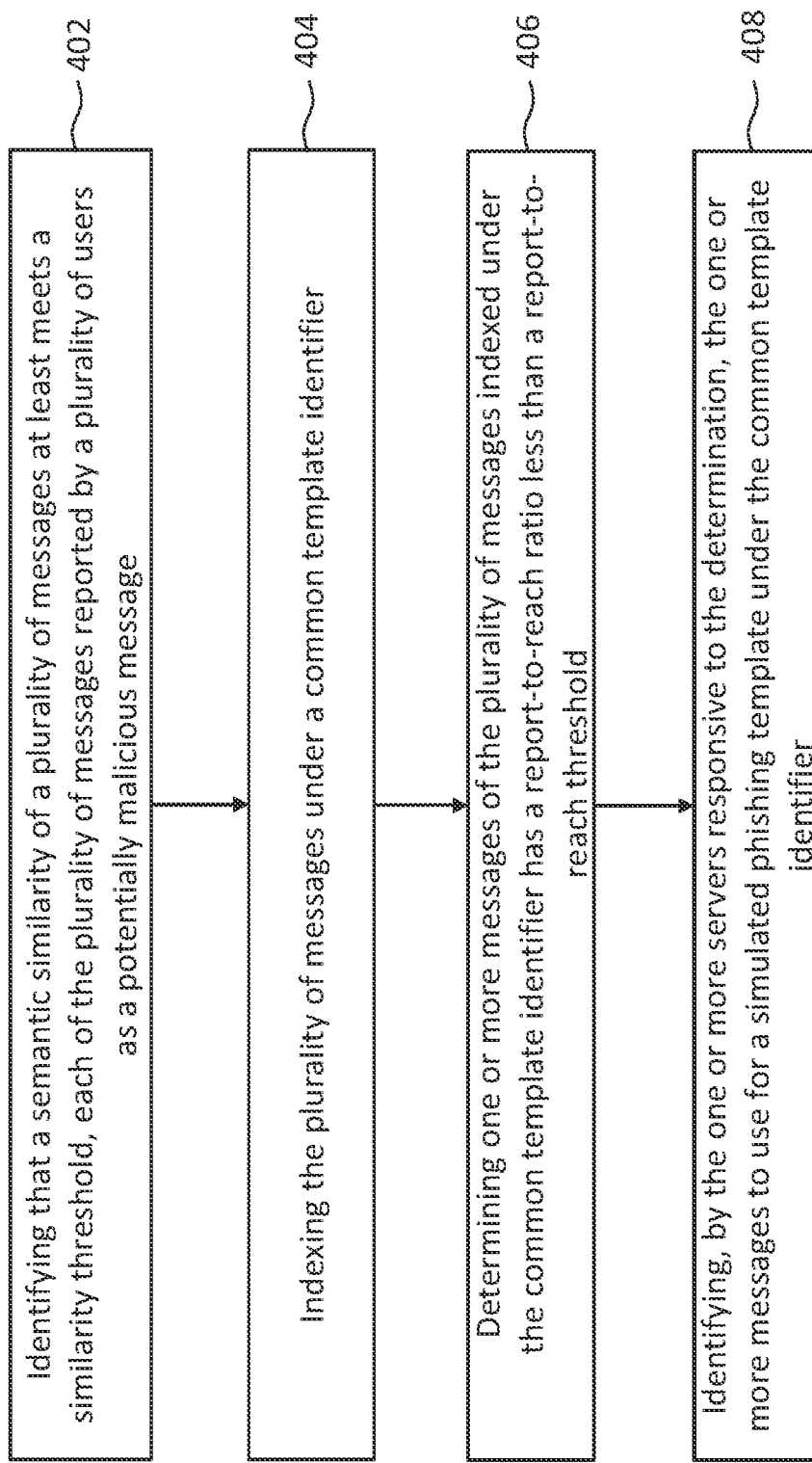
FIG. 4 depicts an implementation of a method for identifying one or more messages to use for a simulated phishing template under the common template identifier automated effective template generation, according to one or more embodiments.

Referring to FIG. 4 in a general overview, FIG. 4 depicts an implementation of a method for determining a report to reach ratio of a plurality of templates, according to one embodiment. In a brief overview of an implementation of process flow 400, at step 402, it may be identified that that a semantic similarity of a plurality of messages at least meets a similarity threshold, each of the plurality of messages reported by a plurality of users as a potentially malicious message. At step 404, the plurality of messages may be indexed under a common template identifier. At step 406, it may be determined that one or more messages of the plurality of messages indexed under the common template identifier has a report-to-reach ratio less than a report-to-reach threshold. At step 408, responsive to the determination, the one or more messages to use for a simulated phishing template under the common template identifier may be determined.

Referring to FIG. 4 in more detail, step 402 includes identifying that a semantic similarity of a plurality of messages that at least meets a similarity threshold. In some examples, one or more of the plurality of messages reported by a plurality of users as a potentially malicious message. In one or more embodiments, automated effective template generator 230 may use semantic similarity analyzer 264 to compare content of each of the plurality of messages to determine the semantic similarity.

Step 404 includes indexing one or more of the plurality of messages under a common template identifier. In one or more embodiments, semantic similarity analyzer 264 may index under a common template identifier the one or more messages of the plurality of messages which have a semantic similarity greater than a semantic similarity threshold. In examples, messages of the plurality of messages which have a semantic similarity less than a semantic similarity threshold are not indexed under a common template identifier. In some examples, one message of the plurality of messages is chosen as the message that the semantic similarity of the remaining templates is determined with respect to.

Step 406 includes determining that one or more templates of the plurality of messages indexed under the common template identifier has a report-to-reach ratio less than a report-to-reach threshold. In one or more embodiments, automated effective template generator 230 may use report-to-reach analyzer 266 to determine the report-to-reach ratio of each message of the plurality of messages based on a number of users who receive each message to the number of those users who report each message as being potentially malicious. In examples, the message of the plurality of messages that is chosen as the message that the semantic similarity of the remaining message is determined with respect to has a report-to-reach ratio that is less than a report-to-reach threshold.

Step 408 includes identifying, responsive to the determination, the one or more messages to use for a simulated phishing template under the common template identifier. In some examples, messages under the common template identifier that do not have a report-to-reach ratio are assigned the report-to-reach threshold as their report-to-reach ratio. In some examples, messages under the common template identifier that do not have a report-to-reach ratio are assigned as their report-to-reach ratio one of the mean or the median of the report-to-reach ratios of the messages indexed under the common template identifier that do have a report-to-reach ratio.

The systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMS, RAMS, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

I claim:

1. A method comprising:
creating, by one or more processors, classification group criteria based at least on a common set of one or more characteristics among a group of users that reported a message as suspicious or did not report the message as suspicious responsive to one or more simulated phishing campaigns directed to the group of users using a plurality of simulated phishing templates;
establishing, by the one or more processors, one or more of the plurality of simulated phishing templates as effective for the classification group criteria;
selecting, by the one or more processors, based at least on effectiveness for the classification group criteria, a simulated phishing template from the one or more of the plurality of simulated phishing templates; and
communicating, by the one or more processors, based at least on the simulated phishing template, a simulated phishing communication to one or more target users having one or more characteristics of the classification group criteria.

2. The method of claim 1, wherein the classification group criteria includes one or more of a job title, job function, location, seniority or department.

3. The method of claim 1, wherein the classification group criteria includes one or more temporal parameters.

4. The method of claim 3, wherein the one or more temporal parameters comprises one or more of the following: length of employment at an organization, length of time since receiving security awareness training, length of time since reporting a suspicious message, length of time since interacting with a simulated phishing message or an actual phishing message.

5. The method of claim 1, further comprising creating, by the one or more processors, the one or more of the plurality of simulated phishing templates categorized as effective for the classification group criteria.

6. The method of claim 1, further comprising identifying, by the one or more processors, from a plurality of existing simulated phishing templates the one or more of the plurality of simulated phishing templates categorized as effective for the classification group criteria.

7. The method of claim 1, further comprising establishing, by the one or more processors, the group of users based at least on which users did or did not report one or more messages as suspicious.

8. The method of claim 1, further comprising identifying, by the one or more processors, a ranking of the one or more of the plurality of simulated phishing templates based at least on effectiveness.

9. The method of claim 8, further comprising selecting, by the one or more processors, the simulated phishing template from the one or more of the plurality of simulated phishing templates based at least on the ranking.

10. The method of claim 1, wherein the effectiveness comprising a report-to-reach ratio, wherein the report-to-reach ratio comprises a metric representing a proportion of users that reported the message as suspicious to a number of users that received the message.

11. A system comprising:
one or more processors, coupled to memory and configured to:
create classification group criteria based at least on a common set of one or more characteristics among a group of users that reported a message as suspicious or did not report the message as suspicious responsive to one or more simulated phishing campaigns directed to the group of users using a plurality of simulated phishing templates;
establish one or more of the plurality of simulated phishing templates as effective for the classification group criteria;

select based at least on effectiveness for the classification group criteria, a simulated phishing template from the one or more of the plurality of simulated phishing templates; and communicate, based at least on the simulated phishing template, a simulated phishing communication to one or more target users having one or more characteristics of the classification group criteria.

12. The system of claim 11, wherein the classification group criteria includes one or more of a job title, job function, location, seniority or department.

13. The system of claim 11, wherein the classification group criteria includes one or more temporal parameters.

14. The system of claim 13, wherein the one or more temporal parameters comprises one or more of the following: length of employment at an organization, length of time since receiving security awareness training, length of time since reporting a suspicious message, length of time since interacting with a simulated phishing message or an actual phishing message.

15. The system of claim 11, wherein the one or more processors are further configured to create the one or more of the plurality of simulated phishing templates categorized as effective for the classification group criteria.

16. The system of claim 11, wherein the one or more processors are further configured to identify from a plurality of existing simulated phishing templates the one or more of the plurality of simulated phishing templates categorized as effective for the classification group criteria.

17. The system of claim 11, wherein the one or more processors are further configured to establish the group of users based at least on which users did or did not report one or more messages as suspicious.

18. The system of claim 11, wherein the one or more processors are further configured to identify a ranking of the one or more of the plurality of simulated phishing templates based at least on effectiveness.

19. The system of claim 18, wherein the one or more processors are further configured to select the simulated phishing template from the one or more of the plurality of simulated phishing templates based at least on the ranking.

20. The system of claim 11, wherein the effectiveness comprising a report-to-reach ratio, wherein the report-to-reach ratio comprises a metric representing a proportion of users that reported the message as suspicious to a number of users that received the message.

* * * * *